Inventor,
Charles C. Crewson.

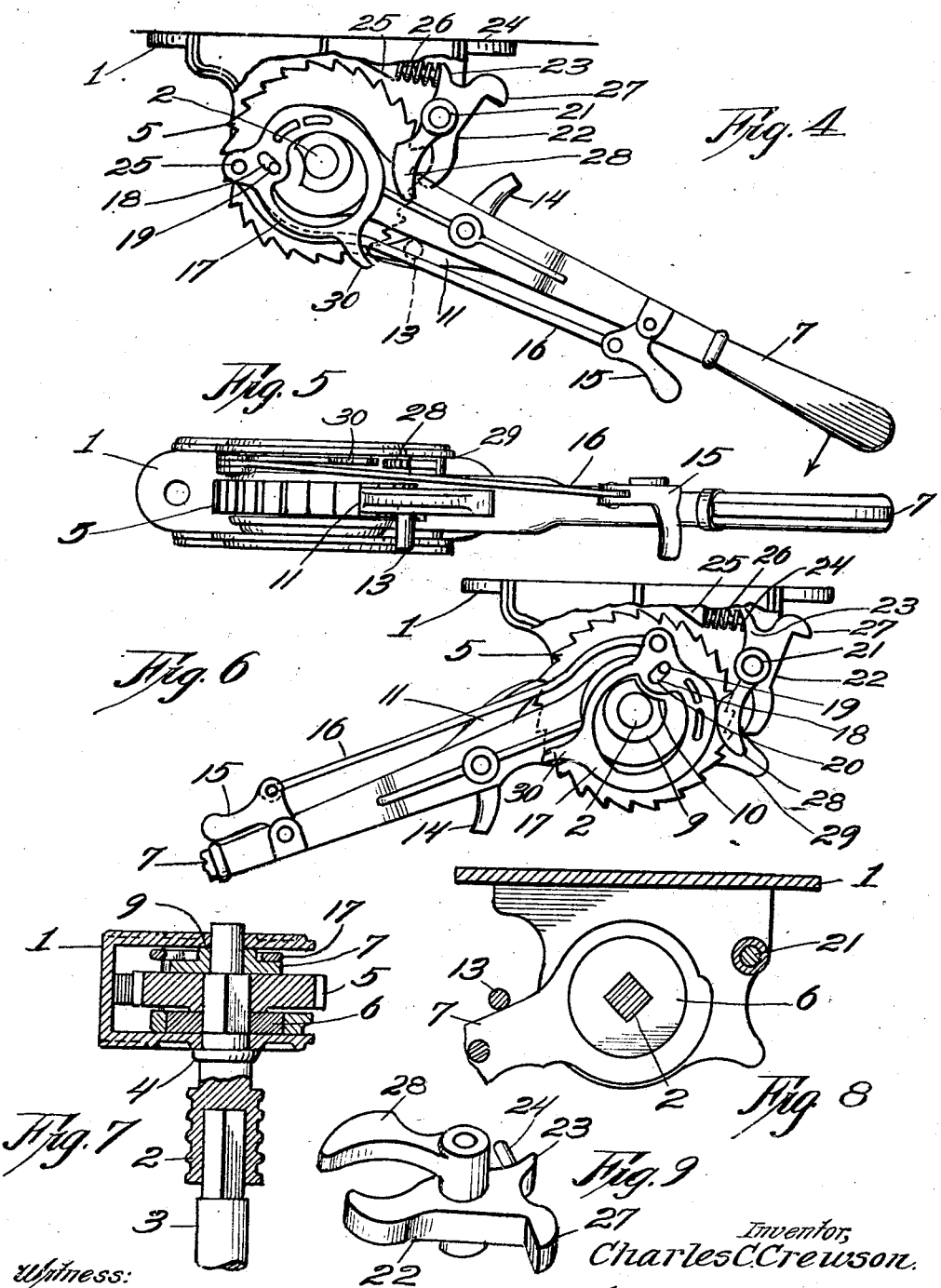

Patented Feb. 3, 1925.

1,524,912

UNITED STATES PATENT OFFICE.

CHARLES C. CREWSON, OF KANSAS CITY, MISSOURI.

BRAKE MECHANISM.

Application filed January 2, 1923. Serial No. 610,105.

*To all whom it may concern:*

Be it known that I, CHARLES C. CREWSON, a citizen of the United States, and resident of Kansas City, county of Jackson, State of Missouri, have invented a certain new and useful Improvement in Brake Mechanism, of which the following is a complete specification.

This invention relates to manually operable car brakes of that class exemplified by my Patent No. 1,380,043 issued May 31, 1921, and has for its object to produce an improved brake mechanism of the class referred to which is positive and efficient in action, by which a car can be "eased" for arrest at the exact point desired without any attendant jolt or jar, and which is not subject to injury through unskillful manipulation.

Another object is to produce a brake mechanism making provision for guarding against injury or breakage as a possible incident to the spinning of the brake staff when the brake is fully released.

A still further object is to produce a powerful brake mechanism of very simple and compact construction.

With these objects in view the invention consists in certain novel and useful features of construction and combinations of parts as hereinafter described and claimed; and in order that it may be fully understood, reference is to be had to the accompanying drawings, in which:—

Figure 4 is a view corresponding to Figure 2, but with the handle in the position it occupies shortly after the brake applying operation begins;

Figure 5 is a side elevation of the mechanism as disclosed by Figure 4;

Figure 6 is a view similar to Figure 2 but with the thumb lever operative to trip the holding dog preliminary to effecting a partial release of the brakes;

Figure 7 is a vertical section taken on the line VII—VII of Figure 2;

Figure 8 is a horizontal section taken on the line VIII—VIII of Figure 7; and

Figure 9 is a detail perspective view of the holding dog.

Figure 1:
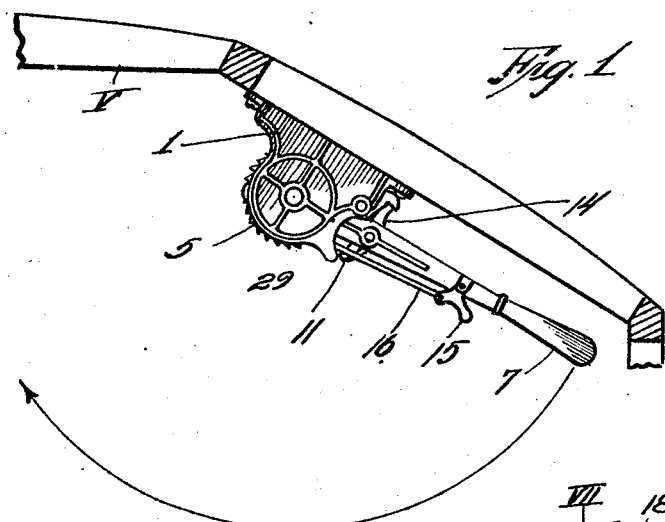
Figure 1 is a plan view of a brake operating mechanism embodying the invention, the mechanism being shown in the brake-released position and as applied in the vestibule portion of a car.

Referring now to the drawings in detail, 1 indicates a horizontally arranged housing or frame of U-shape secured in the vestibule V of a car. Journaled in the housing is the vertical extension 2 of a brake shaft 3, the extension 2 having a flange 4 abutting the lower side of the housing or frame as a partial support for the latter, which of course will be bolted or otherwise rigidly secured to the car. The said extension within the lower half of the housing, is of rectangular form and non-rotatably carries a ratchet wheel 5, and a circular hub 6 underlying the ratchet wheel, the hub 6, in conjunction with the cylindrical portion of the extension above the ratchet wheel, forming a journal for the operating lever or handle 7, which is horizontally bifurcated to accommodate or fit astride of the ratchet wheel and is adapted for operation in a horizontal plane.

The upper part of the head or journaled end of the handle is provided with a cylindrical hub or collar 9, having a peripheral cavity 10 for a purpose hereinafter mentioned, and the handle carries pivotally a pawl 11 normally held in engagement by a spring 12 with the said ratchet wheel. A boss 13 depends from the pawl adjacent its ratchet-engaging end, and said pawl is provided at its opposite ends with a tail 14. A thumb lever 15 is pivotally mounted on the handle and is connected pivotally by a link 16 with a cam 17 of substantially ring form, resting on the lever and around the hub or collar 9 thereof. The cam is provided with a slot 18 pivotally and slidingly receiving a fulcrum pin 19 projecting upward from the lever or handle, and inward of the slot the cam is formed with a protuberance 20 which at times enters the cavity or recess 10, as when the cam is swung to the right (see Figure 6), to trip the holding dog hereinafter identified, it being understood however that the parts may be proportioned to avoid the necessity of having the protuberance and cavity.

Pivoted at 21 within the housing is a dog 22. The tail 23 of the dog is provided with a pin 24 facing a pin-carrying shoulder 25 of the housing, and a spring 26 fits upon said pins and bears at its opposite ends against said shoulder and the tail of the dog and tends to cause the dog to engage the ratchet wheel and thereby lock the same against back rotation, as will hereinafter appear. The tail of the dog is also provided with an outwardly projecting shoulder 27 for engagement at times by the tail 14 of pawl 11, and projecting from the hub of the dog 22 is a trip arm 28 for engagement at times by the cam 17. The housing has a lug 29 for holding the pawl inoperative when the handle is in its initial position, and the cam has a nose 30 adapted upon striking arm 28, to effect the return of the cam to inoperative position. When the lever or handle is in its initial position the tail of pawl 14 is pressed against the shoulder 27 of dog 22 and hence holds the latter disengaged from the ratchet wheel and the brakes in released condition. To apply the brakes, handle 7 is swung from the released position in the direction indicated by the arrow, Figure 1. In this operation the boss rides over the lug 29 and in so doing overcomes the resistance of spring 26, to effect the release of the dog by the pawl and permit of the engagement of both with the ratchet wheel, and the turning of the latter and the brake staff and hence through the customary connections, effect the application of the brakes, the dog 22 securing the ratchet wheel and staff against back rotation. In this operation the cam 17 turns as a unit with the handle and performs no function, and if the slack in the brakes is not fully taken up, the handle can be swung back part way and then again to the left to impart additional turning movement to the ratchet wheel, this last manipulation being repeated if necessary to effect the desired braking result.

To effect the full release of the brakes the handle is swung back to its initial position. In this action the pawl rides over the teeth of the ratchet wheel and just before the movement is completed, the boss 13 rides over the lug 29 and the pawl is thereby rocked to inoperative position and its tail caused to impinge squarely against the shoulder of the dog, to trip the latter to inoperative position, the resistance of spring 26 tending to hold the boss 13 pressed against the rear edge of lug 29 and thus secure both dog and pawl out of engagement with the ratchet wheel, and guard against injury to the pawl or stripping of teeth from the ratchet as the latter spins back with the shaft, this back spin always occurring as the handle attains its initial position.

Figure 2:
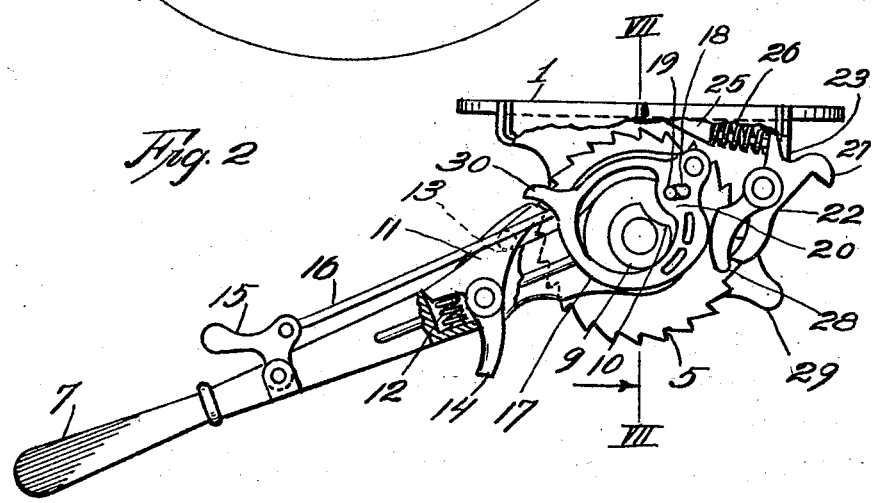
Figure 2 is an enlarged plan view with certain parts of the brake mechanism broken away, the operative mechanism occupying the position for holding the brakes in applied position.
Figure 3:
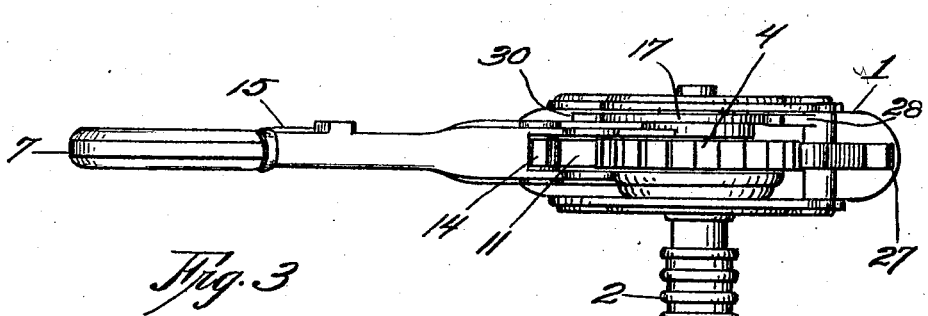
Figure 3 is a side elevation of the brake operating mechanism.

In the event the car tends to stop too soon, upon the application of the brakes, the latter can be "eased off" by pressing the thumb lever 15 from the position shown by Figure 2, to the position shown by Figure 6, this action imparting swinging movement to the cam from the position it occupies in Figure 2 to that it occupies in Figure 6, the cam thus acting as a lever to apply pressure on arm 28 of the dog to trip the latter from engagement with the ratchet wheel. This tripping action leaves the handle interlocked through its pawl with the ratchet wheel so that by relaxing the manually-exercised restraint on the handle in the desired degree, the staff is permitted to turn backward under the pull of the brake mechanism, to permit of continued movement of the car. If the momentum acquired by the car is too great, the operator can apply more resistance by readvancing the handle, and if necessary, can release the thumb lever to permit the dog when struck by the cam, to return the latter and said lever to inoperative position, the dog at such time engaging the ratchet wheel and holding it against further back rotation.

In the event the operator by pressure on the thumb lever, holds the cam in operative position in swinging the handle back to initial position, so that the body of the cam passes back of arm 28 without contact therewith, the nose of the cam will strike arm 28, and the cam be pushed back to inoperative position.

It will be apparent that the tail of the pawl will engage and trip the dog upon full release movement of the handle in the event the lug 29 was omitted, but in this event the handle would have to be held back until the "spin" of the shaft was ended to guard against possible injury to the pawl or the ratchet wheel. The locking of the handle, dog and pawl minimizes rattling or noise.

From the above description it will thus be apparent that I have produced a brake mechanism embodying the features of advantage enumerated as desirable in the statement of the objects of the invention, and while I have illustrated and described the preferred form of embodiment of the invention, it will be apparent that it is susceptible of modification in minor particulars without departing from the principle of construction or mode of operation involved.

What I claim is:

1. A brake mechanism comprising a staff, a handle, means operable by the handle for turning the staff for brake-applying purposes, holding means to prevent reverse rotation of the staff, and means to trip the holding means without changing the position of the handle, said means being adapted to be returned to inoperative position after its tripping function is accomplished, by the holding means upon partial reverse or brake-release movement of the handle.

2. A brake mechanism comprising a staff, a handle, means operable by the handle for turning the staff for brake-applying purposes, holding means to prevent reverse rotation of the staff, and means to trip the holding means without changing the position of the handle, said means being adapted to be returned to inoperative position after its tripping function is accomplished by the holding means upon full reverse or return movement of the handle.

3. A brake mechanism comprising a staff, a handle, means operable by the handle for turning the staff for brake-applying purposes, holding means to prevent reverse rotation of the staff, a cam, and manually-operable means carried by the handle, for causing the cam to trip said holding means without changing the position of the handle.

4. A brake mechanism comprising a staff, a handle, means operable by the handle for turning the staff for brake-applying purposes, holding means to prevent reverse rotation of the staff, a cam, and manually-operable means for causing the cam to trip said holding means without changing the position of the handle; said cam having a nose to engage the holding means upon the full reverse movement of the handle, to return the cam to inoperative position.

5. A brake mechanism comprising a staff, a handle, a pawl and ratchet mechanism operable by the handle for turning the staff for brake-applying purposes, holding means to prevent reverse rotation of the staff, means to trip the holding means without changing the position of the handle, and means to secure the pawl and holding means in inoperative position upon the return of the handle to initial position.

6. A brake mechanism comprising a staff, a handle, a pawl and ratchet mechanism operable by the handle for turning the staff for brake-applying purposes, holding means to prevent reverse rotation of the staff, means to trip the holding means without changing the position of the handle, a fixed lug, and a boss on the pawl for cooperation with the lug in tripping the pawl to and holding it in inoperative position when the handle is in its initial position.

7. A brake mechanism comprising a staff, a handle, a pawl and ratchet mechanism operable by the handle in its power movement, for turning the staff for brake-applying purposes, the pawl having a tail at the opposite side of its pivotal point from its ratchet-engaging point, holding means to prevent reverse rotation of the staff provided at the opposite side of its pivotal point from its ratchet-engaging point, with a shoulder, said shoulder being adapted by impact thereon of the tail of the pawl, to be tripped as reversed movement imparted to the handle comes to an end, a fixed lug, and a boss on the pawl for cooperation with the lug in throwing the pawl to inoperative position and in positioning the pawl to dispose its tail to engage said shoulder and thereby trip and hold the holding means in inoperative position when the handle is at the end of its reversed movement.

In witness whereof I hereunto affix my signature.

CHARLES C. CREWSON.